(12) United States Patent
Guerber et al.

(10) Patent No.: US 12,717,178 B2
(45) Date of Patent: Aug. 25, 2026

(54) PHASE MODULATOR AND METHOD FOR PRODUCING SAME

(71) Applicant: COMMISSARIAT A L'ENERGIE ATOMIQUE ET AUX ENERGIES ALTERNATIVES, Paris (FR)

(72) Inventors: Sylvain Guerber, Grenoble Cedex (FR); Jonathan Faugier-Tovar, Grenoble Cedex (FR); Daivid Fowler, Grenoble Cedex (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 378 days.

(21) Appl. No.: 18/690,969

(22) PCT Filed: Sep. 12, 2022

(86) PCT No.: PCT/EP2022/075321
§ 371 (c)(1),
(2) Date: Mar. 11, 2024

(87) PCT Pub. No.: WO2023/036991
PCT Pub. Date: Mar. 16, 2023

(65) Prior Publication Data

US 2025/0138346 A1 May 1, 2025

(30) Foreign Application Priority Data

Sep. 13, 2021 (FR) ....................................... 2109573

(51) Int. Cl.
*G02F 1/01* (2006.01)
*G02F 1/295* (2006.01)

(52) U.S. Cl.
CPC .......... *G02F 1/0147* (2013.01); *G02F 1/2955* (2013.01); *G02F 2203/50* (2013.01)

(58) Field of Classification Search
CPC ..................................................... G02F 1/0147
See application file for complete search history.

(56) References Cited

U.S. PATENT DOCUMENTS

2019/0339549 A1* 11/2019 Watanabe ............. G02F 1/0147
2020/0393547 A1 12/2020 Noda et al.

FOREIGN PATENT DOCUMENTS

CA 2130605 A1 2/1995

OTHER PUBLICATIONS

International Search Report & Written opinion Issued Oct. 28, 2022, in PCT/EP2022/075321, filed on Sep. 12, 2022, 10 pages (with English translation).

(Continued)

*Primary Examiner* — Joseph P Martinez
(74) *Attorney, Agent, or Firm* — Oblon, McClelland, Maier & Neustadt, L.L.P.

(57) ABSTRACT

The invention is based on a thermo-optic phase modulator comprising, in a stack, a waveguide, an encapsulation layer and a heating element configured to heat the waveguide, said modulator being bordered by first and second trenches. Advantageously, the waveguide, the encapsulation layer and the heating element, each have first and second flanks forming at least partially the flanks of the trenches. The flanks of the waveguide, of the encapsulation layer and of the heating layer thus open directly into the trenches bordering the modulator.
The invention is also based on a method for producing such a compact modulator.

16 Claims, 7 Drawing Sheets

(56) References Cited

OTHER PUBLICATIONS

Smith Francis et al. “A Design Study of Efficiency Enhancement in Silicon Photonic Thermo-Optic Phase Shifters”, 2019 IEEE Optical Interconnects Conference (01), IEEE, Apr. 24, 2019, 2 pages, DOI: 10.I 109/0IC.2019.8714481 XP033550382, 2 pages.
Fang et al. “Ultralow Power Silicon Photonics Thermo-Optic Switch With Suspended Phase Arms”, IEEE Photonics Technology Letters, vol. 23, No. 8, Apr. 15, 2011, 3 pages.
Lu et al. “Michelson Interferometer Thermo-Optic Switch on SOI With a 50-μW Power Consumption”, IEEE Photonics Technology Letters, vol. 27, No. 22, Nov. 15, 2015, 4 pages.

* cited by examiner

PHASE MODULATOR AND METHOD FOR PRODUCING SAME

TECHNICAL FIELD OF THE INVENTION

The field of the invention is that of on-chip integrated photonics. The invention relates more specifically to producing phase modulators. These phase modulators can advantageously be used in circuits of the "Optical Phased Array" (OPA) type, for example for the design of laser remote detection systems, called laser imaging detection and ranging (LiDAR) systems.

PRIOR ART

A LIDAR system can combine two main functions which are the measurement of distance by a laser beam and the scanning of the beam in space. In current systems, this latter function is generally ensured by a set of orientable mirrors. This type of solution requires high-precision mechanics and has several disadvantages linked in particular to the bulk, consumption, reliability and cost.

A new generation of LiDARs based on optical phased arrays OPA are developed to overcome the disadvantages mentioned above.

Such arrays comprise a series of optical antennas separated by an array pitch of around the wavelength of the laser beam. Each optical antenna receives a part of the laser beam and emits an optical signal. Each optical antenna comprises a phase modulator configured to modulate the phase of the optical signal. It is thus possible to control the phase difference between the optical signals emitted from one antenna to another. By applying a linear phase gradient between the signals emitted by each antenna, the interference produced takes the form of a beam directed in a given direction. By modifying the slope of this phase gradient, it is thus possible to modify the beam angle of the OPA.

Such that an OPA produces one single beam, the optical antennas of the OPA must be close to one another, with an array pitch of around the wavelength of the beam. This poses numerous problems, in particular, at the phase modulators which must be very close to one another, by avoiding the mutual impacts between those close to one another. It is therefore necessary to isolate the phase modulators from one another, while designing a compact architecture for each modulator.

Among the different types of phase modulators, thermo-optic phase modulators—utilising the dependence of the refraction index of a material to the temperature—are generally preferred. Such a known thermo-optic phase modulator is disclosed in the document, "A Design Study of Efficiency Enhancement in Silicon Photonic Thermo-Optic Phase Shifters, Francis Smith et al., IEEE, 2019", and schematically illustrated in FIG. 1. A heating element 13, for example, a TiN bar, is generally placed above the waveguide 11 so as to heat it. Isolation trenches 21, 22 are generally formed on either side of the modulator 1, so as to confine the heat produced by the heating element at the waveguide. This makes it possible to avoid a diffusion of heat in other adjacent modulators. This also makes it possible to increase the modulation effectiveness of the modulator, by increasing the variation in temperature at the waveguide for a given electrical power.

To respect the manufacturing tolerances, the array pitch pr separating two adjacent thermo-optic modulators 1 is, as a minimum, 1.2 μm. For an operating wavelength A of 905 nm, this corresponds to $pr \approx 1.3\lambda$. The compactness of this thermo-optic modulator is therefore not sufficient, in particular, for certain OPA-type applications operating at submicronic wavelengths. Moreover, the modulation frequency of such a modulator is limited by thermal diffusion/dissipation phenomena.

There is therefore a need consisting of improving the compactness of a thermo-optic phase modulator and/or the modulation frequency of such a modulator.

An aim of the present invention is to respond to this need, and to propose a thermo-optic phase modulator which overcomes at least partially, some of the disadvantages mentioned above.

Another aim of the present invention relates to a method for producing such a thermo-optic phase modulator.

SUMMARY OF THE INVENTION

To achieve this aim, according to an embodiment, a thermo-optic phase modulator is provided, comprising a stack in a first direction z, said stack comprising a waveguide configured to guide a light beam of wavelength A in a second direction x, an encapsulation layer surmounting the waveguide and a so-called heating element, configured to heat the waveguide, said heating element surmounting the encapsulation layer. The modulator further comprises first and second trenches extending over either side of the stack.

Advantageously, the waveguide, the encapsulation layer and the heating element each have first and second flanks, such as the first flanks of the waveguide, of the encapsulation layer and of the heating element forming at least partially, one flank of the first trench, and the second flanks of the waveguide, of the encapsulation layer and of the heating element form at least partially one flank of the second trench.

The flanks of the waveguide, of the encapsulation layer and of the heating element thus open directly into the trenches bordering the modulator.

The modulator therefore has a bulk by width reduced with respect to the known modulator illustrated in FIG. 1. The compactness of the modulator is increased. This makes it possible to move the modulators closer to one another, for example in the case of an OPA-type optical system.

Moreover, the waveguide is directly in contact with the air circulating in the trenches. This makes it possible to improve the thermal confinement within the waveguide. The power necessary for heating the waveguide is decreased. The effectiveness of the modulator is thus improved.

Furthermore, the air circulating in the trenches has a low refraction index. This increases the optical confinement of the beam in the waveguide, by index contrast.

In the known architecture and illustrated in FIG. 1, a residual space, typically of around 150 nm, is necessarily provided between the flanks of the guide, and those of the trench. These residual space in particular serves to tolerate the alignment errors between the waveguide and trench lithography steps, during the manufacturing of the modulator.

According to another aspect of the present invention, a method for producing the modulator, such as described in the embodiment above is proposed.

According to an embodiment, a method for producing at least one thermo-optic phase modulator is provided, comprising a stack in a first direction z, said stack comprising a waveguide configured to guide a light beam of wavelength A in a second direction x, an encapsulation layer surmounting the waveguide, a so-called heating element configured to heat the waveguide and surmounting the encapsulation layer, said modulator further comprising first and second trenches extending on either side of the stack.

The method comprises:

- A formation of a base stack comprising, in the first direction z, a waveguide pattern, an initial encapsulation layer surmounting the waveguide, and the heating element surmounting the initial encapsulation layer,
- An etching of the base stack in the first direction z, configured to form the first and second trenches and the stack bordered by said first and second trenches, the waveguide being obtained from the waveguide pattern, and the encapsulation layer being obtained from the initial encapsulation layer.

Advantageously, the heating element forms an etching mask during the formation by etching of the first and second trenches, such that the waveguide, the encapsulation layer and the heating element each have first and second flanks, such as the first flanks of the waveguide, the encapsulation layer and the heating element form at least partially one flank of the first trench, and the second flanks of the waveguide, of the encapsulation layer and of the heating element form at least partially one flank of the second trench.

The heating element thus has flanks forming partially flanks of the first and second trenches.

Thus, it is no longer necessary to provide a residual space for tolerating a misalignment between the heating element and an external etching mask for etching trenches, since the heating element itself serves as an etching mask for forming trenches.

The etching of trenches is subsequently self-aligned with the heating element. The first and second trenches are moved closer to one another. This makes it possible to reduce the bulk by width of the modulator.

Moreover, using the heating element as an etching mask makes it possible to avoid resorting to an additional etching mask. The number of steps of the method is decreased.

Preferably, during the formation of the stack, the waveguide pattern is defined so as to have, projecting in the first direction z, a so-called enlarged zone intended to form a modulation zone of the waveguide and having a width L taken in a third direction y, and the heating element is defined so as to have a width Lc in the third direction y, such that $Lc<L$ such that, during the formation by etching of the first and second trenches, the enlarged zone of the waveguide pattern is at least partially etched in the first direction z. The waveguide, at its modulation zone, thus has flanks forming partially flanks of the first and second trenches. The heating element is thus self-aligned with the waveguide.

Using an enlarged zone advantageously makes it possible to tolerate the alignment errors between the heating element and the underlying waveguide pattern. The stress on the alignment is thus relaxed. Standard lithography equipment can be used. The cost of the method is decreased.

Another aspect of the invention relates to an optical phased array (OPA) comprising a plurality of thermo-optic phase modulators such as described above, separated by an array pitch pr. The array pitch pr is around equal to a wavelength A of a light beam being propagated in the waveguides of the array, in operation. The array pitch pr is preferably less than 1 μm. An advantageous application relates to the compact OPA manufacture operating at a wavelength of around 905 nm.

Other aims, features and advantages of the present invention will appear upon examining the description below and the accompanying drawings. It is understood that other advantages can be incorporated. In particular, certain features and certain advantages of the modulator can be applied mutatis mutandis to the optical system of the OPA type and/or to the method for manufacturing this modulator, and reciprocally.

BRIEF DESCRIPTION OF THE FIGURES

The aims, objectives, as well as the features and advantages of the invention will best emerge from the detailed description of embodiments of the latter, which are illustrated by the following accompanying drawings, wherein.

Figure 1:
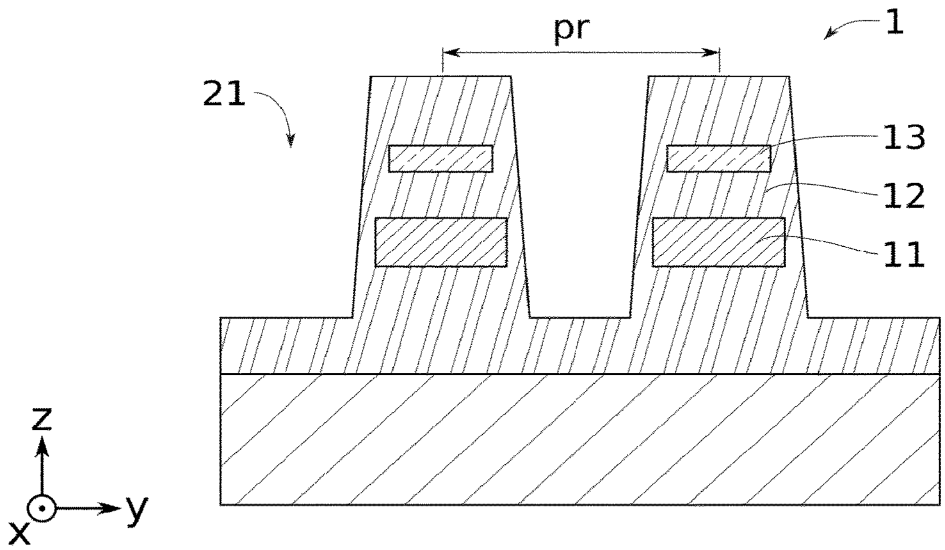
FIG. 1 schematically illustrates, as a cross-section, a thermo-optic phase modulator according to the prior art.

The drawings are given as examples, and are not limiting of the invention. They constitute principle schematic representations intended to facilitate the understanding of the invention, and are not necessarily to the scale of practical applications. In particular, in the principle diagrams, the dimensions of the different elements (waveguide, heating element, injection, transition, modulation zones, etc.) are not representative of reality.

DETAILED DESCRIPTION OF THE INVENTION

Before starting a detailed review of embodiments of the invention, optional features are stated below, which can optionally be used in association or alternatively:

According to an example, the first flanks of the waveguide, of the encapsulation layer and of the heating element open directly into the first trench. According to an example, the second flanks of the waveguide, of the encapsulation layer, and of the heating element open directly into the second trench.

According to an example, the first flanks of the waveguide, of the encapsulation layer and of the heating element are substantially comprised in one same first plane. According to an example, the second flanks of the waveguide, of the encapsulation layer and of the heating element are substantially comprised in one same second plane.

According to an example, the heating element has a top exposed to air.

According to an example, the heating element extends beyond the trenches in the second direction x.

According to an example, the waveguide comprises a modulation zone and at least one transition zone. According to an example, the trenches extend all along the modulation zone and beyond the at least one transition zone, in the second direction x.

According to an example, the heating element is TIN-based. According to an example, the waveguide is SiN- or Si-based.

According to an example, each modulator is configured to modulate a phase of a light beam of wavelength λ being propagated within the waveguide in a second direction x.

According to an example, two adjacent modulators of the optical phased array are separated by a trench taken from among the first and second trenches. According to an example, said modulations are disposed in a third direction y according to an array pitch pr substantially equal to the wavelength λ of the light beam.

According to an example, the wavelength λ and the array pitch pr are less than 1 μm.

According to an example, during the formation by etching of the first and second trenches, flanks of the waveguide are formed substantially to the right of the flanks of the heating element, said flanks of the waveguide forming at least partially the flanks of the first and second trenches.

According to an example, during the formation of the base stack, the waveguide pattern is defined so as to have, projecting in the first direction z, a so-called enlarged zone Z1 intended to form a modulation zone of the waveguide, said enlarged zone Z1 having a width L taken in a third direction y. According to an example, the heating element is defined so as to have a width Lc in the third direction y, such that Lc<L, such that, during the formation by etching of the first and second trenches, the enlarged zone Z1 of the waveguide pattern is at least partially etched in the first direction z.

According to an example, the waveguide pattern is defined so as to have, projecting in the first direction z, an injection zone Z3 of width I in the third direction y, such that I<Lc<L, and a transition zone Z2 inserted between the injection zone Z3 and the enlarged zone Z1, such that the flanks of the heating element intercept the edges of the transition zone Z2, projecting in the first direction z.

According to an example, the heating element covers, projecting in the first direction z, a part of the transition zone Z2 and a part of the injection zone Z3, such that the first and second trenches extend beyond the transition zone Z2 in the second direction x.

According to an example, the etching of the base stack is done through an opening of the resin-based mask above the heating element, said opening having a first dimension l31 in the second direction x less than a length lc of the heating element 13 in said second direction x, and a second dimension L31 in a third direction y greater than a width Lc of the heating element in said third direction y.

According to an example, the formation by etching of the first and second trenches comprises at least one first etching configured to etch the initial encapsulation layer and at least one second etching configured to etch the waveguide pattern.

According to an example, the at least one modulator comprises a first modulator and a second modulator separated by a trench taken from among the first and second trenches. According to an example, the first modulator comprises a first heating element and the second modulator comprises a second heating element, said first and second heating elements (13) being separated by an array pitch pr less than 1 μm, taken in the third direction y.

According to an example, the formation of the base stack comprises a definition of first and second waveguide patterns respectively having first and second enlarged zones Z1 which are continuous to one another.

Unless incompatible, technical features described in detail for a given embodiment can be combined with the technical features described in the context of other embodiments described as an example and in a non-limiting manner, so as to form another embodiment, which is not necessarily illustrated or described. Such an embodiment is clearly not excluded from the invention.

In the scope of the present invention, the waveguide is intended to ensure the propagation of a light beam in a main propagation direction, taken along the axis x in the accompanying drawings. The light beam is preferably consistent, monochromatic, and of wavelength A. It is preferably propagated in one single optical propagation mode, typically the fundamental optical mode. The light beam is thus called "monomodal".

It is specified that, in the scope of the present invention, the terms "on", "surmounts", "covers", "opposite" and their equivalents, do not necessarily mean "in contact with". Thus, for example, the deposition of a first layer on a second layer, does not compulsorily mean that the two layers are directly in contact with one another, but means that the first layer covers at least partially the second layer by being either directly in contact with it, or by being separated from it by at least one other layer or at least one other element.

A layer can moreover be composed of several sublayers of one same material or of different materials.

By a substrate, an element, a layer, "with the basis of" a material A, this means a substrate, an element, a layer comprising this material A only, or this material A and optionally other materials, for example, alloy elements and/or doping elements. Thus, a silicon nitride SiN-based waveguide can, for example, comprise non-stoichiometric silicon nitride (SixNx), or stoichiometric silicon nitride ($Si_3N_4$).

By "selective etching with respect to" or "etching having a selectivity with respect to", this means an etching configured to remove a material A or a layer A with respect to a material B or a layer B, and having an etching speed of the material A greater than the etching speed of the material B. The selectivity is the ratio between the etching speed of the material A over the etching speed of the material B.

A preferably orthonormal system, comprising the axes x, y, z is represented in the accompanying figures. When one single system is represented in one same set of figures, this system is applied to all the figures of this set.

Unless mentioned otherwise, the widths are taken in the direction y of the accompanying system. When the flanks are not fully parallel to one another, for example due to imperfections linked to the manufacturing methods, the retained width can be the greatest width value measured, or the average width value along the height of the flanks. For example, the width of a waveguide can be measured at its top. The width of a trench can be measured between the tops of two adjacent waveguides. The propagation of the 30 light beam is done typically along x.

Relative terms, such as "on", "surmounts", "under", "underlying", "above", "below" refer to positions taken along the direction z. This list of terms is not exhaustive. Other relative terms can be easily specified as needed, by referring to the accompanying drawings.

In the present patent application, the height and the depth are taken along z.

The terms "vertical", "vertically" refer to a direction along z. The terms "horizontal", "horizontally" refer to a direction in the plane xy. The term "lateral", when this is a movement or a positioning, also refers to a direction in the plane xy, typically the direction y.

An element located "in vertical alignment with" or "to the right of" another elements means that these two elements are both located on one same line oriented vertically in the figures.

Figure 2:
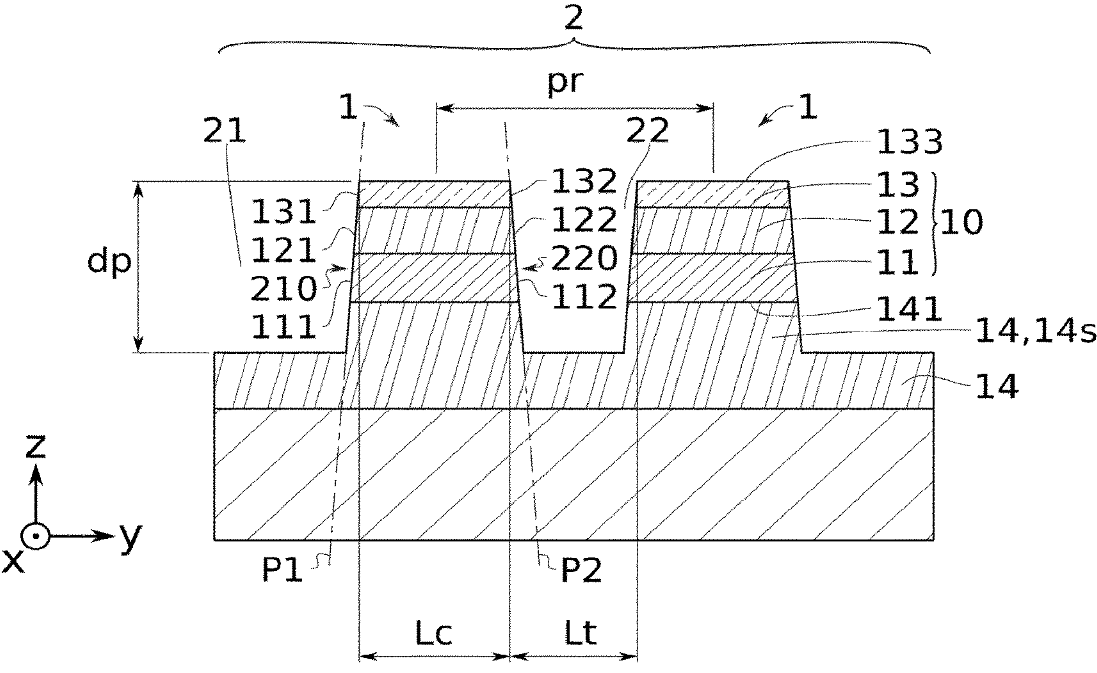
FIG. 2 schematically illustrates, as a cross-section, a thermo-optic phase modulator according to an embodiment of the present invention.

FIG. 2 illustrates a thermo-optic phase modulator 1 according to an embodiment of the present invention. The modulator 1 comprises a waveguide 11, an encapsulation layer 12, and a heating element 13 in a stack along z. The waveguide 11 typically rests on a base 14 made of a material being able to have a refraction index close to that of the encapsulation layer 12. Preferably, the encapsulation layer 12 and the base 14 are made of one same material. The base 14 and the encapsulation layer 12 typically make it possible to confine the light beam within the waveguide 11 by index contrast. Thus, the refraction index of the waveguide material 11 is typically greater than the refraction indices of the materials of the base 14 of the encapsulation layer 12. According to an example, the waveguide 11 is silicon nitride-based and the base 14 and the encapsulation layer 12 are silicon oxide-based. According to another example, the waveguides 11 is silicon-based and the base 14 and the encapsulation layer 12 are silicon oxide-based. The base 14 typically rests on a substrate, for example, a silicon-based solid substrate.

The modulator 1 is bordered by trenches 21, 22 of width Lt along y, and of depth dp along z. The width Lt is preferably between 200 nm and 1 μm, typically around 300 nm. The depth dp is preferably between a few hundred nanometres and a few microns. The trenches 21, 22 preferably extend along z up to within the layer forming the base 14, even up to the interface between the base 14 and the substrate. The substrate can serve as a stop layer for the etching of the trenches 21, 22. The stack 10 thus rests on a part 14*s* projecting from the base 14 or from the substrate. This projecting part 14*s* can have a height of a few hundred nanometres. This makes it possible to increase the thermal confinement within the waveguide 11. According to an alternative option, the stack 10 rests on a base 14 in the form of a flat layer. In this case, the trenches 21, 22 are stopped substantially in the plane of the interface 141 between the waveguide 11 and the base 14. According to another option, the trenches 21, 22 are stopped above the plane of the interface 141. In this latter case, the cross-section of the waveguide 11 in the plane yz can have an inverted T-shape. Such a geometry corresponds to an edge waveguide.

The waveguide 11 has flanks 111, 112 each opening into the trenches 21, 22. The flanks 111, 112 are not covered by an encapsulation material. They thus directly form some of the flanks 210, 220 of the corresponding trenches 21, 22. A so-called liner thin layer, of around a few nanometres thick, typically less than 10 nm thick, can optionally cover the flanks 111, 112 of the waveguide 11.

The encapsulation layer 12 has flanks 121, 122 each opening into the trenches 21, 22. The flanks 121, 122 are substantially in the extension of the flanks 111, 112 respectively.

The heating element 13 surmounts the encapsulation layer 12. It is typically TIN-based. It can comprise other layers, for example, a Ti adhesion layer. According to an example, the heating element 13 comprises a 10 nm Ti adhesion layer surmounted by a 100 nm TiN layer. The heating element 13 typically makes it possible to heat the waveguide 11 by Joule effect. The heating element 13 has a width Lc along y, typically of between 300 nm and 1000 nm, for example around 600 nm. The heating element 13 have flanks 131, 132 each open into the trenches 21, 22. The flanks 131, 132 are not covered by an encapsulation material. They thus directly form some of the flanks 210, 220 of the corresponding trenches 21, 22. The flanks 131, 132 are substantially in the extension of the flanks 121, 122, respectively. The heating element 13 has a top 133, preferably not covered by an encapsulation material. The top 133 can be exposed to air.

The flanks 111, 121, 131 form at least partially one flank 210 of the trench 21. They are preferably substantially comprised in one same plane P1. The flanks 112, 122, 132 form at least partially one flank 220 of the trench 22. They are preferably substantially comprised in one same plane P2. The planes P1, P2 are preferably ideally vertical and parallel to one another. In practice, these planes P1, P2 can have an angle of a few degrees with respect to the vertical. The flanks 210, 220 subsequently have a slight slope, typically due to the etching of the trenches 21, 22. The trenches 21, 22 are thus disposed closest to the stack 10. This makes it possible to reduce the lateral bulk of the modulator 1. This also makes it possible to reduce the total volume to be heated by the heating element 13. The heating of the waveguide 11 is therefore done more effectively. This reduces the energy consumption of the modulator 1.

The trenches 21, 22 are preferably filled with air. This makes it possible to effectively confine the heat produced in the waveguide 11, during a modulation by thermo-optic effect. The modulation frequency can thus be increased. This also makes it possible to effectively confine the light beam within the wave guide 11, by index contrast between the waveguide 11 and the air. According to an option, the trenches 21, 22 can be filled with a filling material.

As illustrated in FIG. 2, several modulators 1 can be disposed to the side of one another, according to a minimised array pitch pr. A compact optical phased array 2 can thus be obtained. In particular, an array pitch pr less than 1 micron, for example around 900 nm, can be achieved. This makes it possible to achieve OPAs 2 operating for submicronic wavelengths, typically with a wavelength λ=905 nm.

FIGS. 3A to 8B illustrate a method for manufacturing a modulator 1 and/or an optical phased array 2. FIGS. 3A, 4A, 5A, 6A, 7A, 8A and 3B, 4B, 5B, 6B, 7B and 8B respectively illustrate, as a top view, and as a cross-section along the plane C-C, a step of the method.

Figure 3A:
FIGS. 3A, 4A, 5A, 6A, 7A and 8A schematically illustrate, as a top view, a step of producing a thermo-optic phase modulator according to an embodiment of the present invention.
Figure 3A:
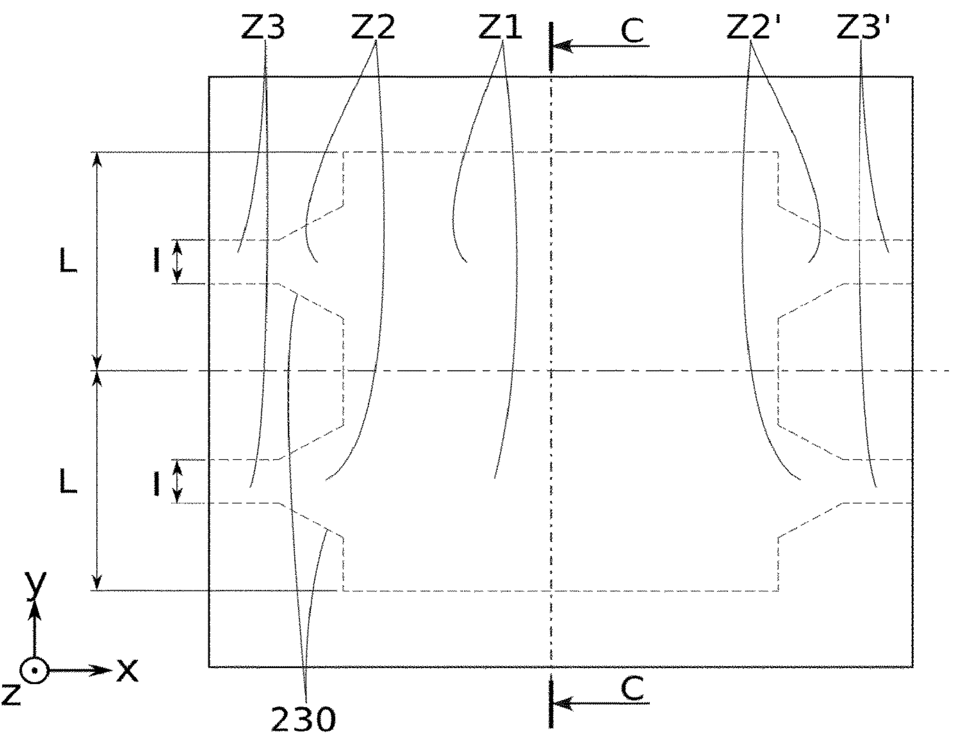
Figure 3B:
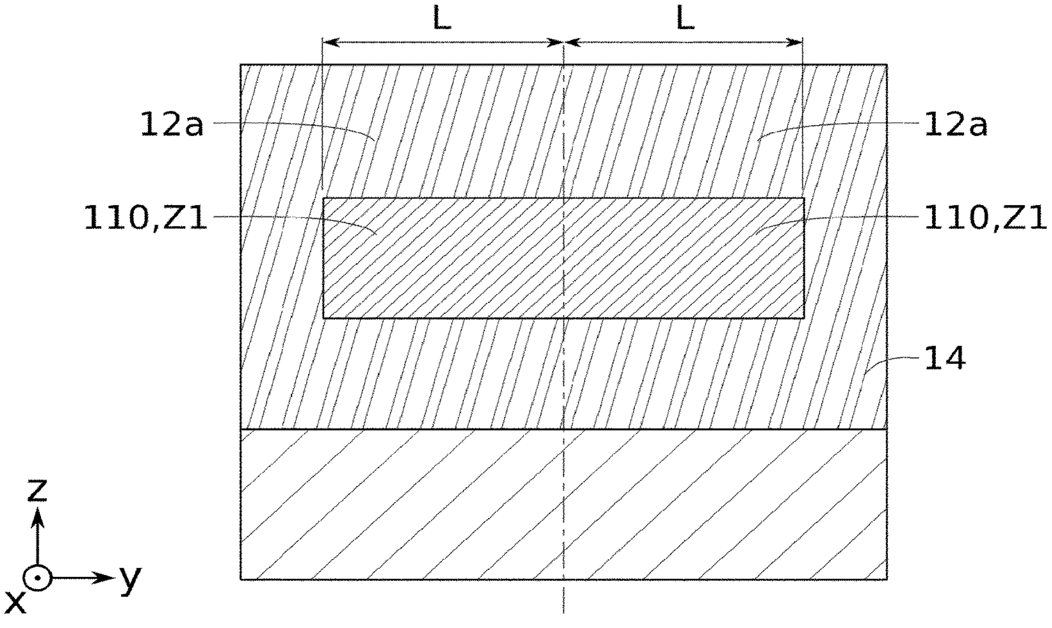
FIGS. 3B, 4B, 5B, 6B, 7B and 8B (n=3 . . . 8) schematically illustrate, as a cross-section along the plane C-C, the step of producing a thermo-optic phase modulator illustrated in corresponding FIGS. 3A, 4A, 5A, 6A, 7A and 8A, according to an embodiment of the present invention.

As illustrated in FIGS. 3A, 3B, during the formation of the base stack, a waveguide pattern 110 is first defined. Two waveguide patterns 110 are illustrated in FIG. 3A. Each pattern 110 preferably comprises an enlarged zone Z1 of width L, and preferably an injection zone Z3 of width I, and preferably a transition zone Z2 inserted between the enlarged zone Z1 and the injection zone Z3. The width I of the injection zone Z3 is preferably between 300 nm and 600 nm. The width L of the enlarged zone Z1 is strictly greater than the width I. It is preferably between 600 nm and 2 μm.

The enlarged zone Z1 is intended to form a modulation zone of the modulator 1. The injection zone Z3 is intended to inject the light beam, preferably monomodally, into the modulation zone. The transition zone Z2, also called taper, is intended to guide the light beam from the injection zone Z3 to the modulation zone. This transition zone Z2 thus typically has a truncated shape, or hexahedral shape with two trapezoidal parallel faces, seen from above. Symmetrically, zones Z2', Z3' are preferably provided on the side opposite the modulator, at the outlet of the modulation zone. In FIGS. 3A, 3B, the waveguide patterns 110 are continuous to one another by way of their respective enlarged zones Z1. According to another option, the waveguide patterns 110 can be separate.

Figure 4A:
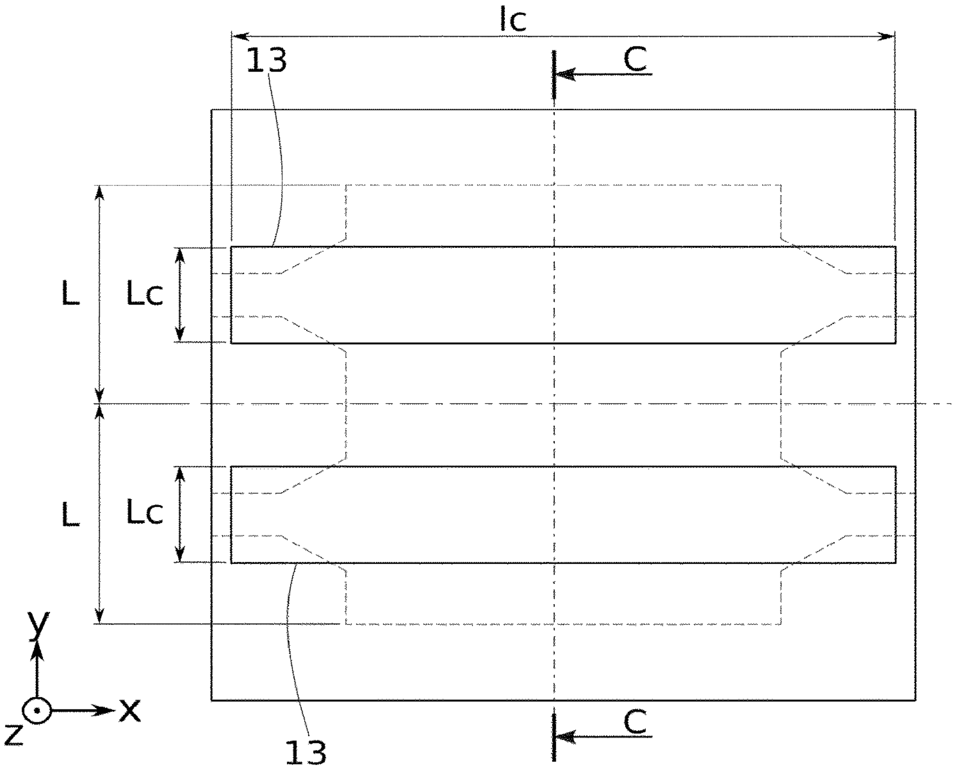
Figure 4B:
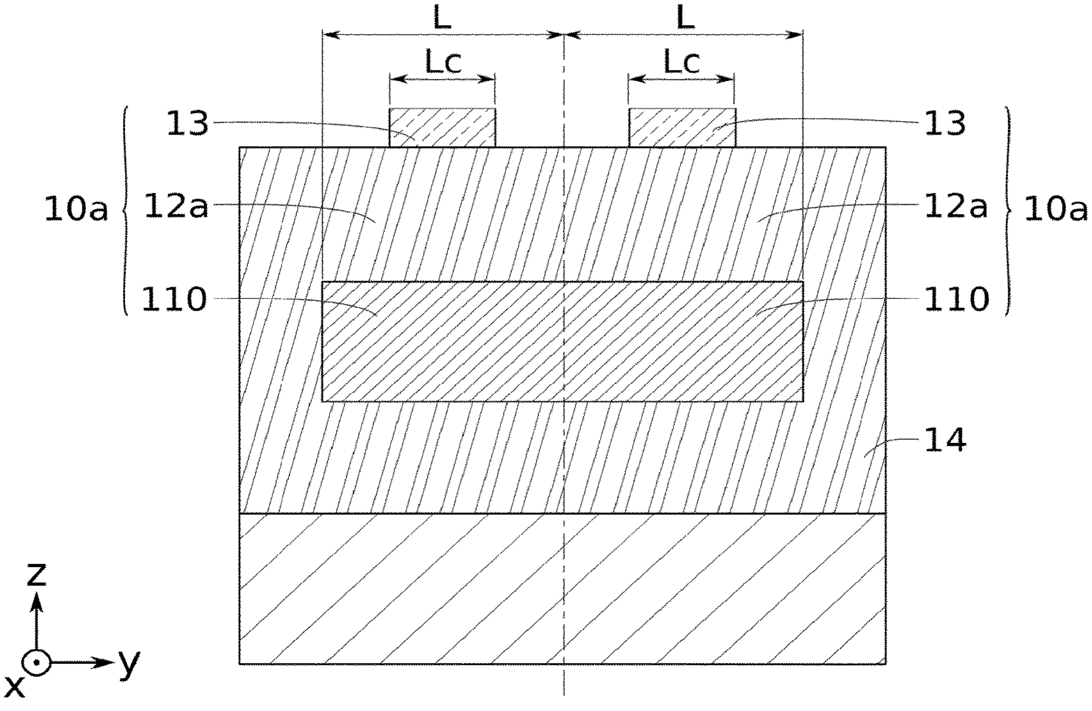

As illustrated in FIGS. 4A, 4B, after definition of the patterns 110 and formation of the initial encapsulation layer 12*a*, the heating element(s) 13 is/are formed. The base stack(s) 10*a* is/are thus obtained. Each heating element 13 has a length lc and a width Lc with Lc<L, and preferably Lc>I. The width Lc of the heating element 13 is preferably between 300 nm and 900 nm, for example 600 nm. Advantageously, the definition of an enlarged zone Z1 of width L strictly greater than the width Lc of the heating element 13 makes it possible to tolerate a positioning error along y of the heating element 13 with respect to the modulation zone of the modulator. Thus, even if an offsetting of a few tens of nanometres along y occurs during the formation of the heating element 13, the latter still covers its entire width Lc, an underlying part of the enlarged zone Z1 of the waveguide pattern 110. Thus, after etching, the flanks of the modulation zone of the waveguide are still substantially located in vertical alignment with the flanks of the heating elements 13.

The heating element 13 preferably extends along x beyond the transition zones Z2, Z2', preferably up to the injection zones Z3, Z3'. The heating element 13 thus intercepts, projecting along z, the edges 230 of the underlying transition zone. The transition zone Z2 also makes it possible to tolerate a decentering along y of the heating element 13 with respect to the injection zone Z3. The light beam can thus remain monomodal during its injection in the modulation zone. This makes it possible, in particular, to avoid insertion losses in the modulation zone. The formation of the heating element 13 can be done conventionally by deposition/lithography/etching or by "lift off".

Figure 5A:
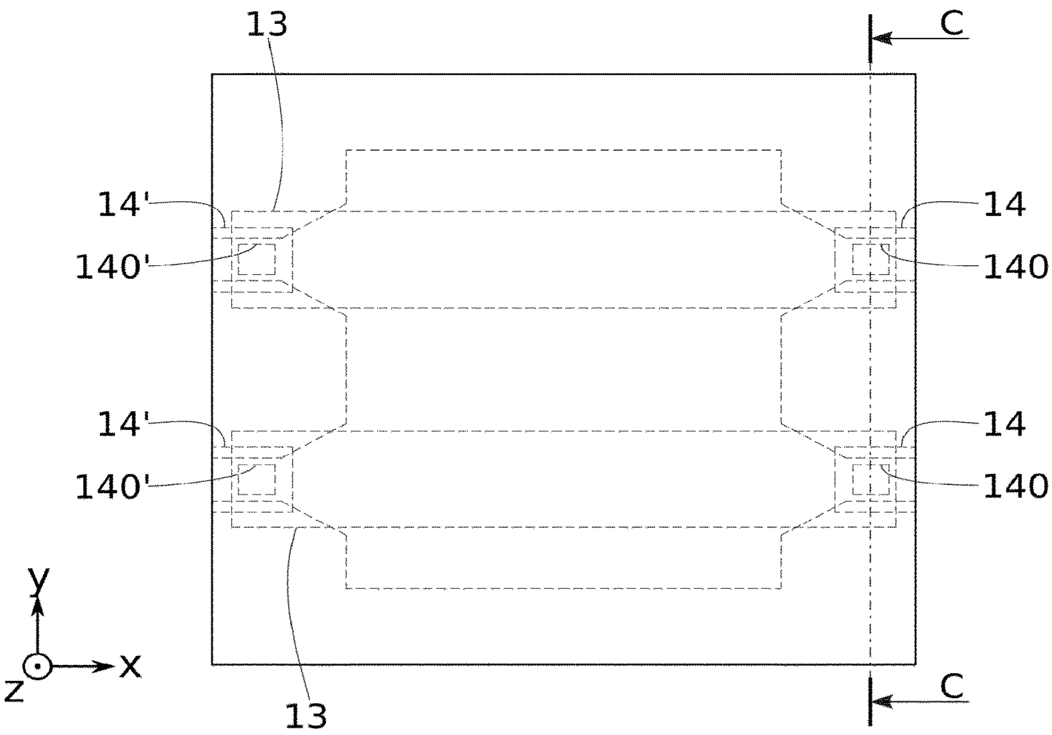
Figure 5B:
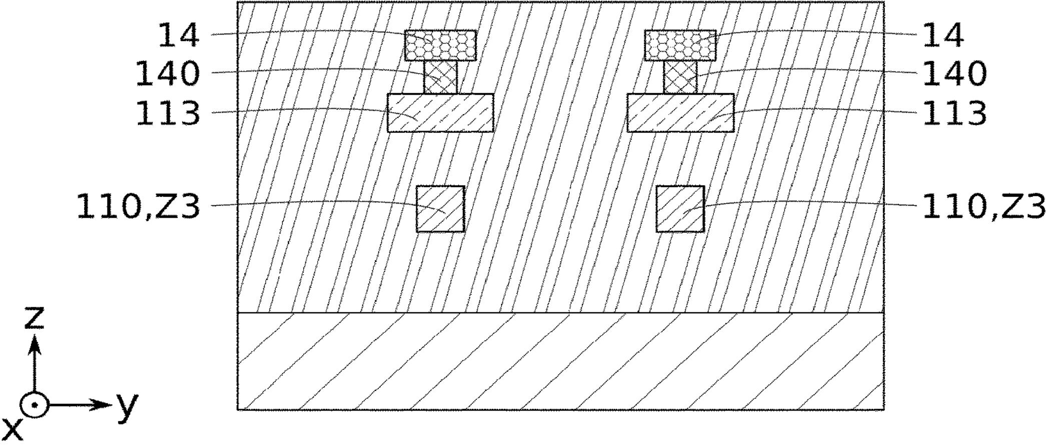

As illustrated in FIGS. 5A, 5B, after formation of the heating element(s) 13, of the electrical contacts 14, 14' can be formed on either side of each heating element 13. The contacts 14, 14' can be formed directly on the heating element 13, or be connected conventionally by vias 140, as illustrated in FIG. 5B. An encapsulation layer, typically with the basis of the same material as the encapsulation layer 12, is preferably formed on and around the heating elements 13, and planarised.

Figure 6A:
Figure 6A:
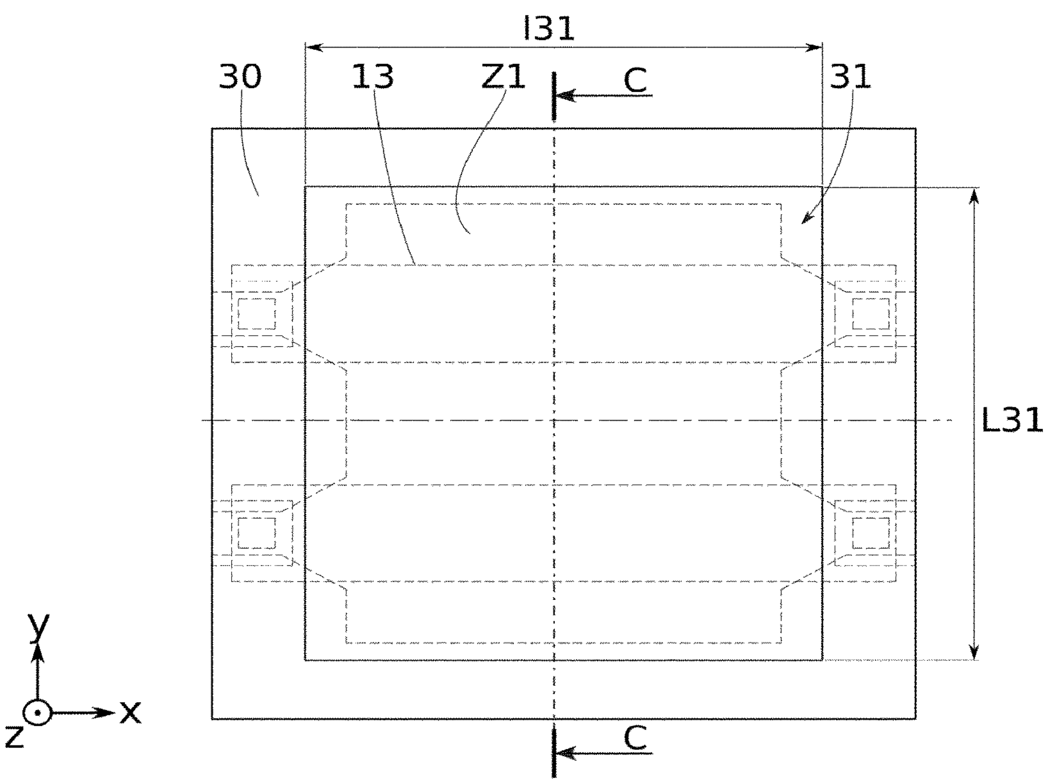
Figure 6B:
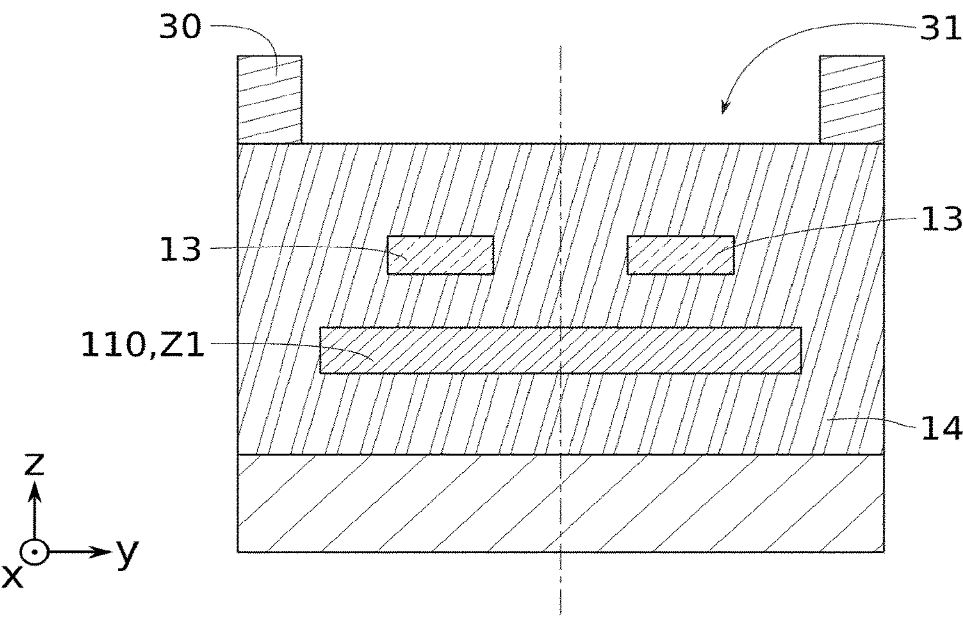

As illustrated in FIGS. 6A, 6B, an etching mask 30, typically photosensitive resin-based, is then formed above the heating elements 13, for example on the surface of the encapsulation layer surrounding the heating elements. The etching mask 30 comprises a wider (L31>Lc) and shorter (l31<lc) opening than the heating elements 13. This opening 31 is also wider and longer than the underlying enlarged zone(s) Z1. This makes it possible to etch the parts of the enlarged zones Z1 not covered by the heating elements 13. This opening 31 preferably extends along x beyond the transition zone Z2, and preferably up to the injection zone Z3.

Figure 7A:
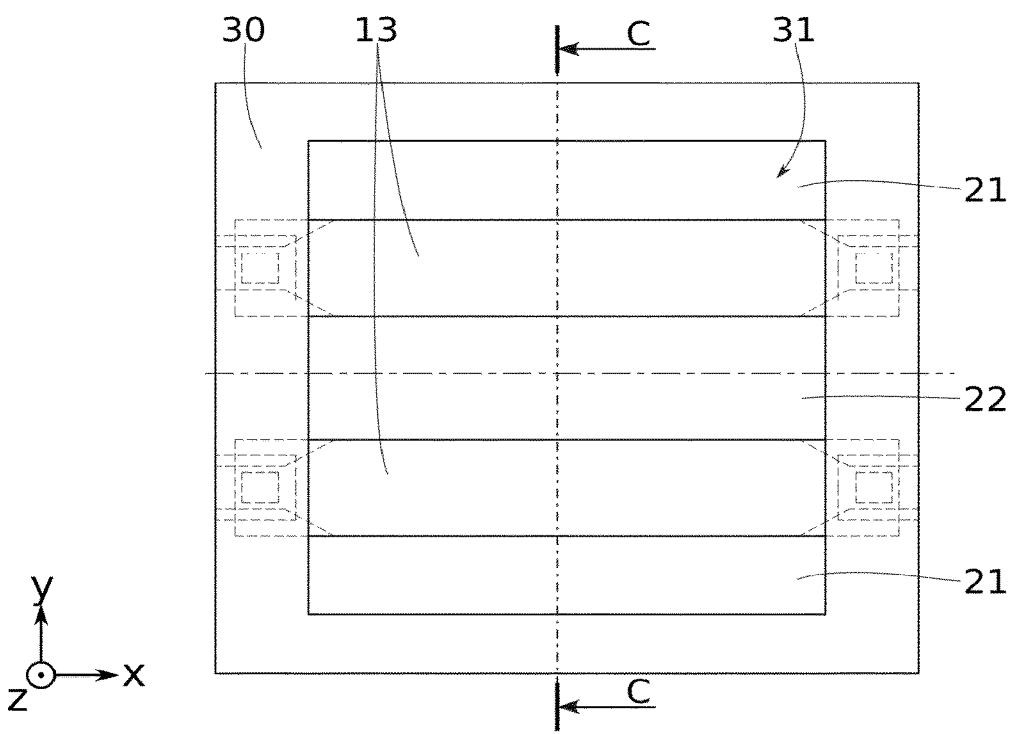
Figure 7B:
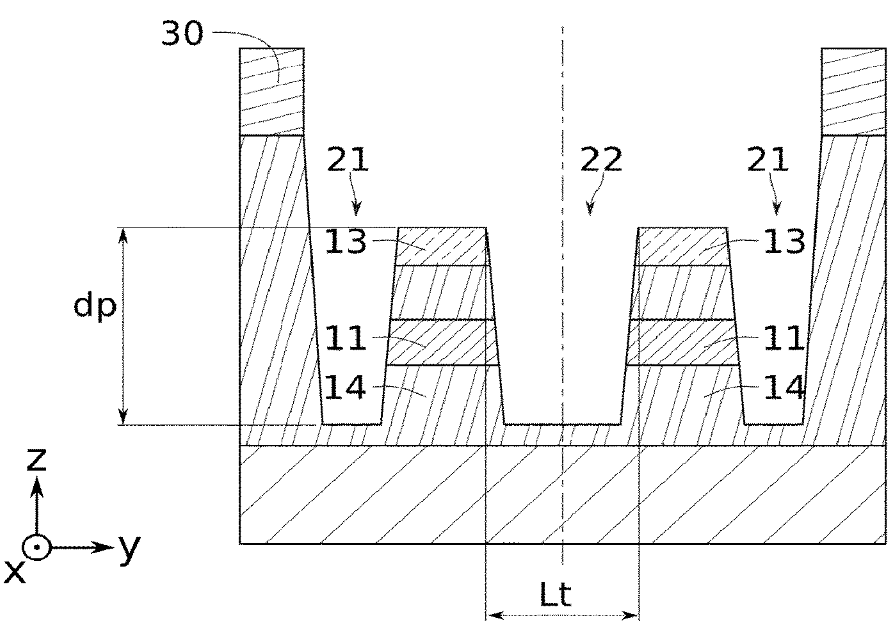

As illustrated in FIGS. 7A, 7B, trenches 21, 22 are then formed by etching through the opening 31 of the etching mask 30. The heating elements 13 advantageously form an etching mask complementary to the mask 30. Thus, during etching, the materials located above the heating elements, and the materials located between the heating elements, projecting along z, are at least partially removed. Coming from the etching, the trenches 30 are formed over a depth dp and the heating elements are exposed, under the opening 31. The height of the trenches is located at the top of the heating element, and the bottom of the trenches is typically located in the base layer under the level of the waveguide. The depth dp of the trenches 21, 22 is thus limited with respect to that of the known modulator illustrated in FIG. 1. This makes it possible to better control the etching profile. According to an option, the etching of the trenches 21, 22 is done in one single and same etching step.

According to a preferred option, the etching of the trenches 21, 22 is done in several successive etching steps. Thus, a first etching is configured to anisotropically etch along z, the material of the encapsulation layer(s). This first etching is preferably selective with respect to the material of the heating element 13. For an $SiO_2$-based encapsulation layer, the first etching is, for example, performed by plasma with the basis of a $CF_4$ and $CHF_3$ fluorinated chemistry. This first etching is preferably configured to be stopped on the waveguide pattern 110. A second etching can then be performed to anisotropically etch along z, the waveguide pattern 110. For an SiN-based pattern 110, this second etching can be performed by plasma with the basis of an $Ar/O_2$ chemistry. This makes it possible to limit the roughness of the flanks 111, 112 of the waveguide 11. Preferably, the second etching is stopped after the pattern 110 has been etched over its entire height. According to another option, for example, to form an edge waveguide, the second etching is stopped before the pattern 110 has been etched over its entire height. Optionally, a third etching can be performed to etch at least partially the base layer 14 on which the stack rests. For a $SiO_2$-based base layer 14, this third etching can be performed with the same parameters as the first etching. Using specific etchings according to the different materials to be etched, makes it possible to better control the etching profile of the trenches. The flanks 20) 210, 220 of the trenches 21, 22 can subsequently be substantially flat.

Figure 8A:
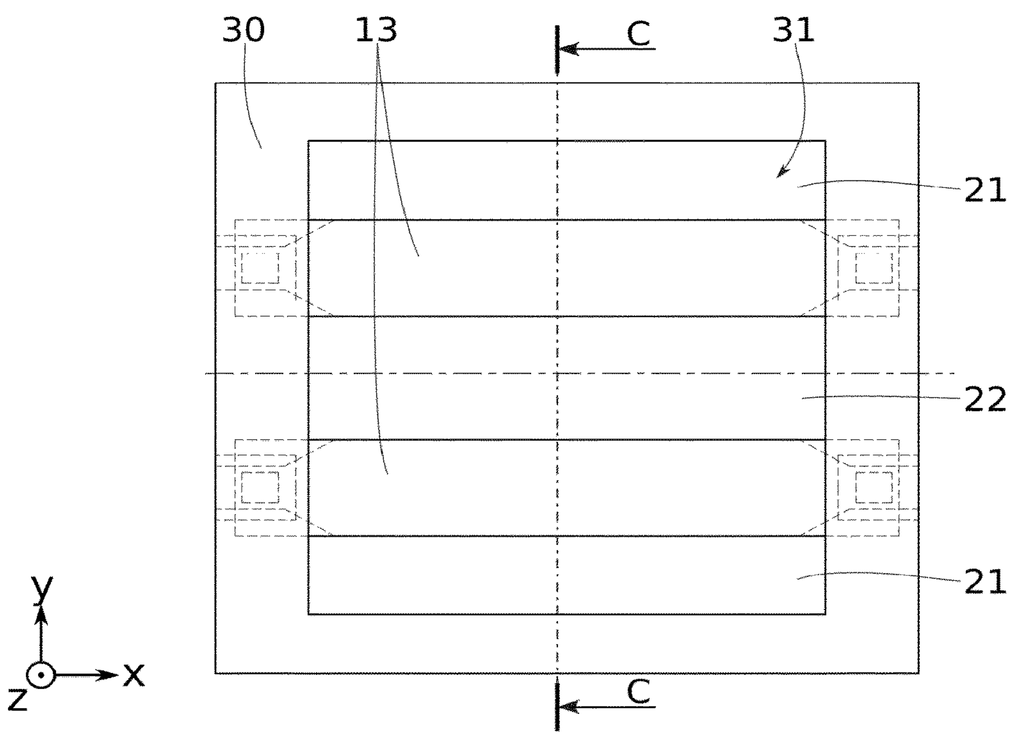
Figure 8B:
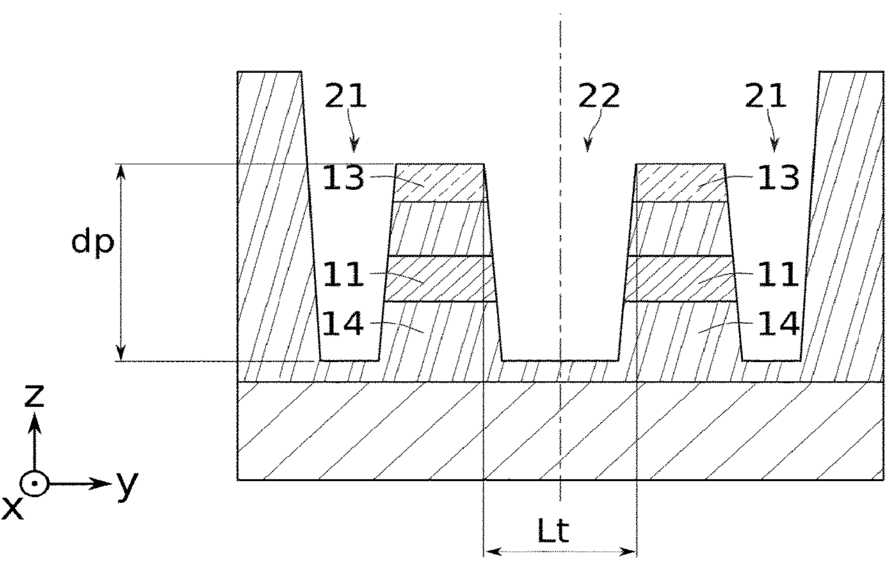

As illustrated in FIGS. 8A, 8B, after formation of the trenches 21, 22, the etching mask 30 is removed. A thermo-optic phase modulator 1 and/or an OPA array are thus obtained. This method is fully compatible with conventional microelectronic technologies. It optionally limits the number of steps necessary with respect to a conventional manufacturing method.

The invention is not limited to the embodiments described above. For example, the guide 11 is not necessarily rectilinear. The guide 11 can be a ring. The injection zone Z3 can be located in a plane lower than that of the modulation zone of the waveguide 11, with a vertical coupling between said zones. Such a geometry can be considered with or without taper on either of the levels.

The invention claimed is:

1. A thermo-optic phase modulator comprising a stack in a first direction, said stack comprising a waveguide configured to guide a light beam of wavelength 2 in a second direction, an encapsulation layer surmounting the waveguide and a so-called heating element configured to heat the waveguide, said heating element surmounting the encapsulation layer, said modulator further comprising first and second trenches extending on either side of the stack, the modulator being wherein the waveguide, the encapsulation layer and the heating element each have first and second flanks such as the first flanks of the waveguide, of the encapsulation layer, and of the heating element form at least partially one flank of the first trench, and the second flanks of the waveguide, of the encapsulation layer and of the heating element form at least partially one flank of the second trench.

2. The modulator according to claim 1, wherein the first flanks of the waveguide, of the encapsulation layer and of the heating element open directly into the first trench and wherein the second flanks of the waveguide, of the encapsulation layer and of the heating element open directly into the second trench.

3. The modulator according to claim 1, wherein the first flanks of the waveguide, of the encapsulation layer and of the heating element are substantially comprised in one same first plane, and wherein the second flanks of the waveguide, of the encapsulation layer and of the heating element are substantially comprised in one same second plane.

4. The modulator according to claim 1, wherein the heating element extends beyond the trenches in the second direction.

5. The modulator according to claim 1, wherein the waveguide comprises a modulation zone and at least one transition zone, and wherein the trenches extend all along the modulation zone and beyond the at least one transition zone, in the second direction.

6. The modulator according to claim 1, wherein the waveguide is SiN- or Si-based.

7. An optical phased array comprising a plurality of thermo-optic phase modulators according to claim 1, wherein two adjacent modulators are separated by a trench taken from among the first and second trenches, said modulators being disposed in a third direction according to an array pitch pr substantially equal to the wavelength λ of the light beam.

8. The optical phased array according to claim 7, wherein the wavelength λ and the array pitch pr are less than 1 μm.

9. A method for producing at least one thermo-optic phase modulator comprising a stack in a first direction, said stack comprising a waveguide configured to guide a light beam of wavelength λ in a second direction, an encapsulation layer surmounting the waveguide, a so-called heating element configured to heat the waveguide and surmounting the encapsulation layer, said modulator further comprising first and second trenches extending on either side of the stack, the method comprising:

A formation of a base stack comprising, in the first direction, a waveguide pattern, an initial encapsulation layer surmounting the waveguide pattern, and the heating element surmounting the initial encapsulation layer, An etching of the base stack in the first direction, configured to form the first and second trenches and the stack bordered by said first and second trenches, the waveguide being obtained from the waveguide pattern, and the encapsulation layer being obtained from the initial encapsulation layer, the method being wherein the heating element forms an etching mask during the formation by etching of the first and second trenches, such that the waveguide, the encapsulation layer and the heating element each have first and second flanks such as the first flanks of the waveguide, of the encapsulation layer and of the heating element form at least partially one flank of the first trench, and the second flanks of the waveguide, of the encapsulation layer and of the heating element form at least partially one flank of the second trench.

10. The method according to claim 9, wherein, during the formation of the base stack, the waveguide pattern is defined, so as to have, projecting in the first direction, a so-called enlarged zone intended to form a modulation zone of the wave guide and having a width L taken in a third direction, and the heating element is defined, so as to have a width Lc in the third direction, such that Lc<L, such that, during the formation by etching of the first and second trenches, the enlarged zone of the waveguide pattern is at least partially etched in the first direction.

11. The method according to claim 10, wherein the waveguide pattern is defined so as to have, projecting in the first direction, an injection zone of width 1 in the third direction such that 1<Lc<L, and a transition zone inserted between the injection zone and the enlarged zone, such that the flanks of the heating element intercept the edges of the transition zone, projecting in the first direction.

12. The method according to claim 11, wherein the heating element covers, projecting in the first direction, a part of the transition zone and a part of the injection zone, such that the first and second trenches extend beyond the transition zone in the second direction.

13. The method according to claim 9, wherein the formation by etching of the first and second trenches comprises at least one first etching to etch the initial encapsulation layer and at least one second etching configured to etch the waveguide pattern.

14. The method according to claim 9, wherein the etching of the base stack is done through an opening of a resin-based mask above the heating element, said opening having a first dimension 131 in the second direction less than a length lc of the heating element in said second direction, and a second dimension L31 in a third direction greater than a width Lc of the heating element in said third direction.

15. The method according to claim 9, wherein the at least one modulator comprises a first modulator and a second modulator separated by a trench taken from among the first and second trenches, the first modulator comprising a first heating element and the second modulator comprising a second heating element, said first and second heating elements being separated by an array pitch pr less than 1 μm, taken in a third direction.

16. The method according to claim 15, wherein the formation of the base stack comprises a definition of first and second waveguide patterns respectively having first and second enlarged zones which are continuous to one another.

* * * * *